US006316739B1

(12) United States Patent
Ohtsuka et al.

(10) Patent No.: US 6,316,739 B1
(45) Date of Patent: Nov. 13, 2001

(54) DEVICE FOR CONTROLLING A BREAKER

(75) Inventors: Kyouichi Ohtsuka; Nobuya Nakajima, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/503,115

(22) Filed: Feb. 14, 2000

(30) Foreign Application Priority Data

Oct. 18, 1999 (JP) ........................................ 11-294739

(51) Int. Cl.[7] ........................ F16H 55/00; H01H 33/02

(52) U.S. Cl. ........................................ 200/400; 200/501

(58) Field of Search ............................ 200/17 R, 400, 200/401, 500, 501, 318, 320, 323, 324–326

(56) References Cited

U.S. PATENT DOCUMENTS 4,839,476 6/1989 Okuno ............................ 200/17 R
5,584,383 * 12/1996 Matsuo et al. .................... 200/400
5,901,838 * 5/1999 Nakatani et al. .................. 200/400
6,069,544 * 5/2000 Seymour et al. .................. 335/185
6,080,947 * 6/2000 Ulerich et al. .................... 200/308
6,232,569 * 5/2001 Nakajima et al. .................. 200/400

* cited by examiner

*Primary Examiner*—Michael Friedhofer
(74) *Attorney, Agent, or Firm*—Sughrue, Mion, Zinn, Macpeak & Seas, PLLC

(57) ABSTRACT

A device for controlling a breaker comprising a weight (48) provided in the vicinity of a releasing trigger (19) and an auxiliary spring (50 )for urging the weight (48) so that the weight (48)is in contact with the releasing trigger (19). An equivalent mass of the weight (48)is about one-third of an equivalent mass of the releasing trigger. When the releasing trigger (19)is in contact with a pin (45) of a releasing latch (18), the weight (48)rebounds but the releasing trigger (19)is settled without rebounding. By such a structure, the rebound of releasing latch and the releasing trigger is prevented when these are engaged, whereby a time for closing a circuit is shortened.

8 Claims, 13 Drawing Sheets

18: Releasing latch
19: Releasing trigger
34: Torsion bar
36: Breaking lever
48: Weight
50: Auxiliary spring 18: Releasing latch
19: Releasing trigger
34: Torsion bar
36: Breaking lever
48: Weight
50: Auxiliary spring 51: Weight
52: Auxiliary spring 53: Weight
54: Connecting spring

DEVICE FOR CONTROLLING A BREAKER

BACKGROUND OF THE INVENTION

1. Field of the Invention

The present invention relates to a device for controlling a breaker, which is used in, for example, a transforming station and a switchyard.

DISCUSSION OF BACKGROUND

A device for controlling a breaker is practically activated by a spring. A conventional technique is disclosed in, for example, Japanese Examined Patent Publication JP-B-63-304542. FIG. 10 illustrates a perspective view of a structure of the conventional device for controlling a breaker. FIGS. 11 through 13 are plan views illustrating the structure of the device for controlling the breaker viewed from a front side of FIG. 10. In FIGS. 10 through 13, numerical reference 1 designates a casing; numerical reference 24 designates a cylinder fixed to the casing; numerical references 26, 27 designate rotatable levers, which are engaged with pins (not shown) provided on an end surface of the cylinder; numerical references 28, 29 designates torsion bars, one ends of which are respectively fixed to the casing 1 and the other ends are respectively fixed to the levers 26, 27; and numerical references 34, 35 designates torsion bars, one ends of which are respectively fixed to rotation shafts 32, 33 and the other ends of which are respectively fixed to the levers 26, 27.

Numerical reference 37 designates a making lever fixed to the rotation shaft 33. The making lever 37 is applied with a turning force in an anticlockwise direction in FIG. 11 by the torsion bars 29, 35. Numerical reference 2 designates a cam shaft supported by the casing 1. Numerical reference 3 designates a cam provided in the cam shaft 2. Numerical reference 13 10 designates a pin B provided in the cam. Numerical reference 14 designates a making latch engaged with the pin B 13. Numerical reference 15 designates a making trigger, which is engaged with the making latch 14. Numerical reference 16 designates an electromagnetic coil having a plunger 17.

Numerical reference 38 designates a rotation shaft supported by the casing 1, which is driven in an anticlockwise direction in FIG. 11. Numerical reference 39 designates a pinion fixed to the rotation shaft 38. Numerical reference 40 designates a gear fixed to the cam shaft 2 and engaged with the pinion 39, in which a part of teeth is omitted to disconnect an engagement with the pinion 39 when the torsion bars 29, 35 are prestressed. Numerical reference 41 designates a link for connecting the making lever 37 to the gear 40.

Numerical reference 36 designates a breaking lever fixed to the rotation shaft 32, which is applied with an anticlockwise turning force by the torsion bars 28, 34. Numerical reference 8 designates a pin A provided in the breaking lever 36, and numerical reference 9 designates a rotator provided in the breaking lever 36. Numerical reference 18 designates a releasing latch, which is engaged with the pin A 8 and applied with a clockwise turning force by the spring 43. Numerical reference 19 designates a releasing trigger engaged with the releasing latch 18. Numerical reference 20 designates a releasing electromagnetic coil having a plunger 21. Numerical reference 22 designates a movable contact of the breaker, which movable contact is connected with the breaking lever 36 through a linkage mechanism 23. Numerical reference 42 designates a buffer connected to the breaking lever 36, which relaxes an impact at a time of opening and closing the movable contact 22.

In the next, an operation of opening a circuit will be described. In FIG. 11, the breaking lever 36 is constantly applied with anticlockwise turning force by the torsion bars 28, 34. The turning force is retained by the releasing latch 18 and the releasing trigger 19.

When the releasing electromagnet 20 is excited under this state, the plunger 21 is rightward operated; the releasing trigger 19 clockwise rotates; and the releasing latch 18 is counterclockwise rotated by counterforce from the pin A 8. When the releasing latch 18 is released from the pin A 8, the breaking lever 36 counterclockwise rotates; and the movable contact 22 moves in a direction of opening a circuit. FIG. 12 illustrates a state that the operation of opening the circuit is completed.

An operation of closing the circuit will be described. In FIG. 12, the cam 3 is connected to the making lever 37 through the cam shaft 2, the gear 40, and the link 41, wherein the cam 3 is applied with clockwise turning force by the torsion bars 29, 35. The turning force is retained by the making latch 14 and the making trigger 15. When the making electromagnet 16 is excited under this state, the plunger 17 is rightward moved; the making trigger 15 clockwise rotates; and the making latch 14 counterclockwise rotates by counter force from the pin B 13. Because the making latch 14 is released from the pin B 13, and therefore the cam 3 clockwise rotates to push up the rotator 9 provided in the breaking lever 36, the breaking lever 36 is driven while clockwise twisting the torsion bars 28, 34.

When the operation of closing the circuit is almost completed, the pin A 8 of the breaking lever 36 is in contact with a lower portion a of the releasing latch 18 to thereby counterclockwise rotate the releasing latch 18 a little. When the pin A 8 exceeds an edge b, the releasing latch 18 is again clockwise rotated by the spring 43; the pin A 8 is in contact with a step c of the releasing latch 18, whereby the releasing latch 18 is engaged with the pin A 8.

Just thereafter, the releasing trigger 19 is counter clockwise rotated to engage with the releasing latch 18. The rotating cam 3 holds the breaking lever 36 via the rotator 9 from a beginning of engagements between the releasing latch 18 and the pin A 8 and between the releasing trigger 19 and the releasing latch 18 to an ending of the engagements. Thereafter, the contact between the cam 3 and the rotator 9 is canceled.

FIG. 13 illustrates a state that the pin A 8 is retained by the releasing latch 18 after completing to close the circuit. As an inherent movement of a device for controlling a breaker, it is necessary to reopen a circuit just after closing the circuit.

Further, because the torsion bars 29, 35 are released while prestressing the torsion bars 28, 34, a prestressing energy of the torsion bars 29, 35 is larger than that of the torsion bars 28, 34.

A prestressing operation of the torsion bars 29, 35 will be described. As illustrated in FIG. 13, just after completing to close the circuit, the torsion bars 29, 35 are released. When a motor (not shown) counterclockwise rotates the pinion 39, the gear 40 is clockwise rotated to prestress the torsion bars 29, 35 through the link 41, the making lever 37, and the rotation shaft 33. At a position where the link 41 exceeds a dead point, in which a direction of a tensile load of the link 41 is in agreement with a center of the cam shaft 2, the cam shaft 2 is applied with clockwise turning force through the link 41 by torque of the torsion bars 29, 35. Simultaneously, since the part of the teeth of the gear 40 is omitted, the pinion 39 and the gear 40 are disengaged. Thereafter, the pin B 13 is engaged with the making latch 14 to retain the clockwise turning force of the gear 40 by the torsion bars 29, 35, whereby the prestressing operation is completed. Thus, the state illustrated in FIG. 11 is regained.

However, in the conventional device for controlling the breaker, when the pin A 8 of the breaking lever 36 is engaged with the releasing latch 18 after completing to close the circuit, the releasing latch 18 clockwise rotates to cause a collision between the step c and the pin A 8, the releasing latch 18 rebounds and returns to an engaged position by the spring 43 to be in contact with the pin A 8. Further, when the trigger 19 is engaged with the releasing latch 18, the releasing trigger collides with the releasing latch 18, and the releasing trigger 19 rebounds and counterclockwise returns to an engaged position so as to be in contact with the releasing latch 18. These rebounds may be repeated by attenuating.

Thus, there are problems that a time is required to complete the engagement by the rebound of the releasing latch and of the releasing trigger, and a succeeding operation of opening the circuit delays.

SUMMARY OF THE INVENTION

It is an object of the present invention to solve the above-mentioned problems inherent in the conventional technique and to provide a device for controlling a breaker, in which a time for completing to close a circuit is short by suppressing rebound caused by a collision of a releasing latch and a rebound caused by a collision of a trigger.

According to a first aspect of the present invention, there is provided a device for controlling a breaker comprising: a breaking lever for closing and opening a circuit along with prestressing force and releasing force of an operating spring, a releasing latch which engages the breaking lever for retaining the prestressing force of the operation spring, and a releasing trigger which engages the releasing latch to retain a state of the releasing latch, further comprising a weight arranged in the vicinity of the releasing trigger and an auxiliary spring for bringing the weight so as to be in contact with the releasing trigger.

According to a second aspect of the present invention, there is provided the device for controlling the breaker according to the first aspect of the invention, wherein the auxiliary spring is a connection spring for connecting the weight to the releasing trigger.

According to a third aspect of the present invention, there is provided the device for controlling the breaker according to the first or second aspect of the invention, wherein a ratio between an equivalent mass of the weight and an equivalent mass of the releasing trigger at a contact point between the weight and the releasing trigger is 1:2 through 1:4.

According to a fourth aspect of the present invention, there is provided a device for controlling a breaker comprising: a breaking lever for opening and closing a circuit along with prestressing force and releasing force of an operation spring, a releasing latch which engages the breaking lever to retain the prestressing force of the operation spring, and a releasing trigger which engages the releasing latch to retain a state of the releasing latch, further comprising a weight arranged in the vicinity of the releasing latch, and an auxiliary spring for prestressing the weight so as to be in contact with the releasing latch.

According to a fifth aspect of the present invention, there is provided the device for controlling the breaker according to the fourth aspect of the invention, wherein the auxiliary spring is a connection spring for connecting the weight to the releasing latch.

According to a sixth aspect of the present invention, there is provided the device for controlling the breaker according to the fourth or fifth aspect of the invention, wherein a ratio between an equivalent mass of the weight and an equivalent mass of the releasing latch at a contact point between the weight and the releasing latch is 1:2 through 1:4.

BRIEF DESCRIPTION OF THE DRAWINGS

A more complete appreciation of the invention and many of the attendant advantages thereof will be readily obtained as the same becomes better understood by reference to the following detail description when considered in connection with the accompanying drawings, wherein.

DETAILED DESCRIPTION OF THE PREFERRED EMBODIMENT

A detailed explanation will be given of preferred embodiments of the present invention in reference to FIGS. 1 through 9 as follows, wherein the same numerical references are used for the same or similar portions and description of these portions is omitted.

EMBODIMENT 1

Figure 1:
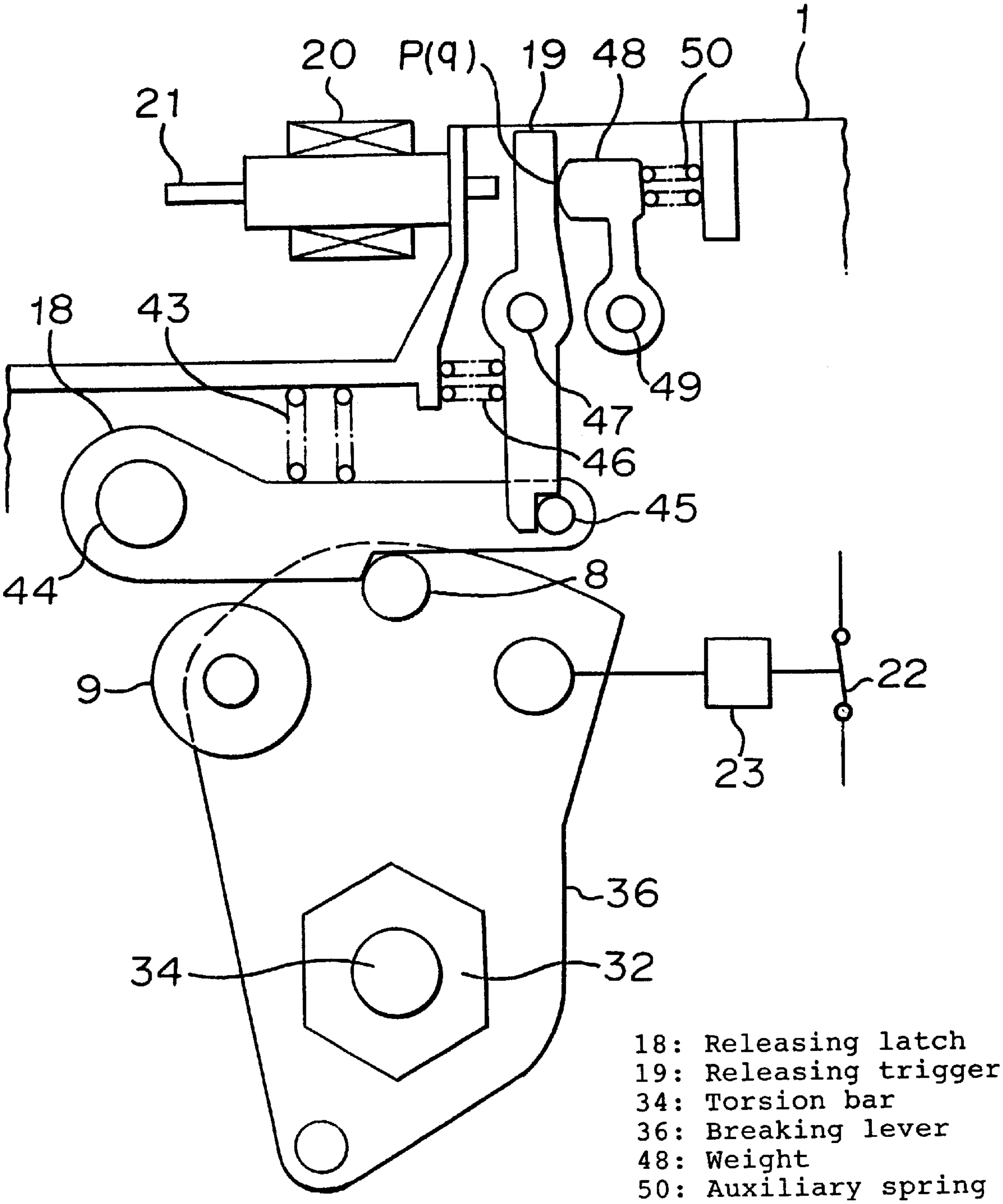
FIG. 1 is a plan view illustrating an important portion of a device for controlling a breaker under a closed circuit state according to Embodiment 1 of the present invention.
Figure 2:
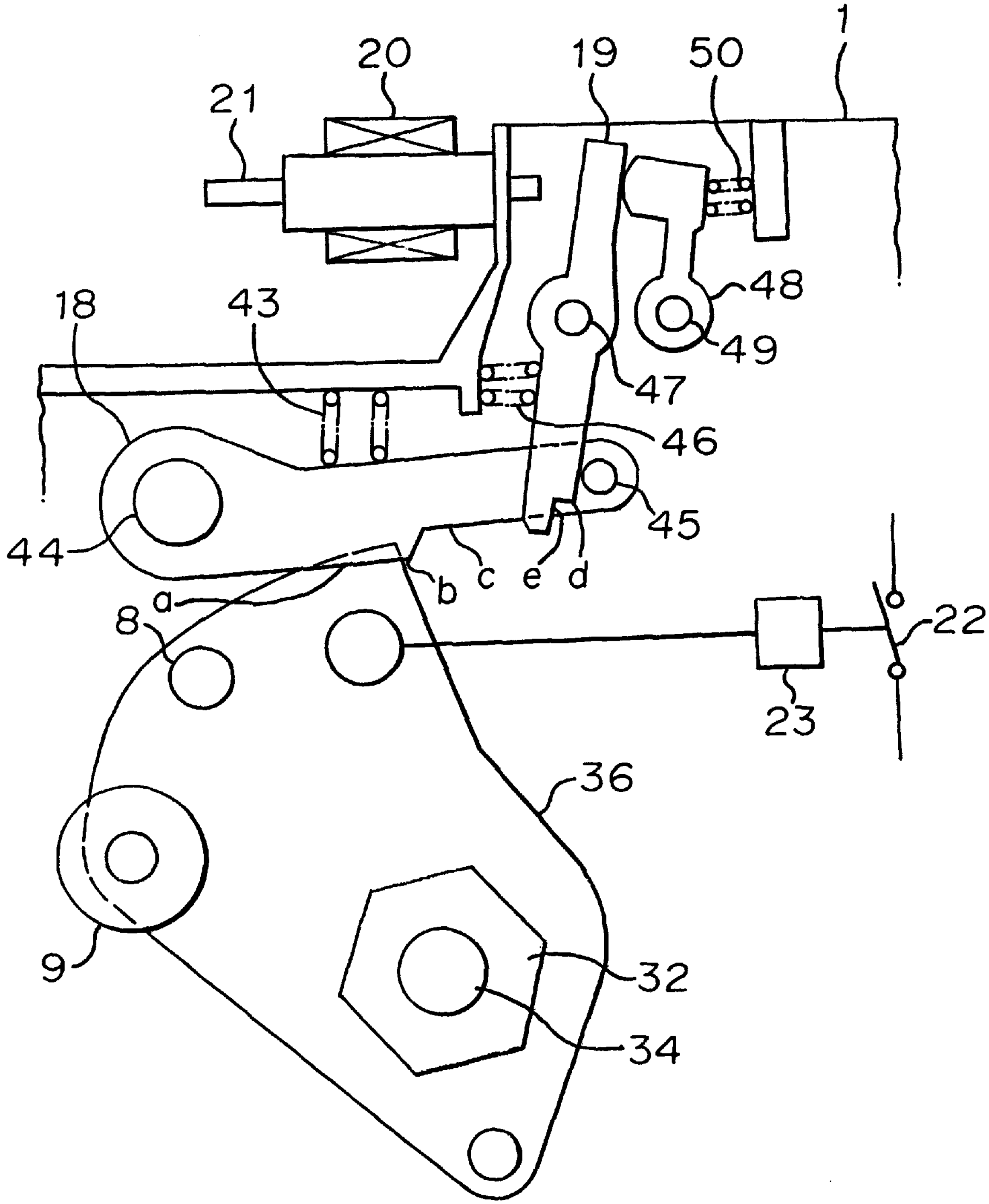
FIG. 2 is a plan view illustrating the important portion of the device for controlling the breaker under an opened circuit state according to Embodiment 1 of the present invention.
Figure 3:
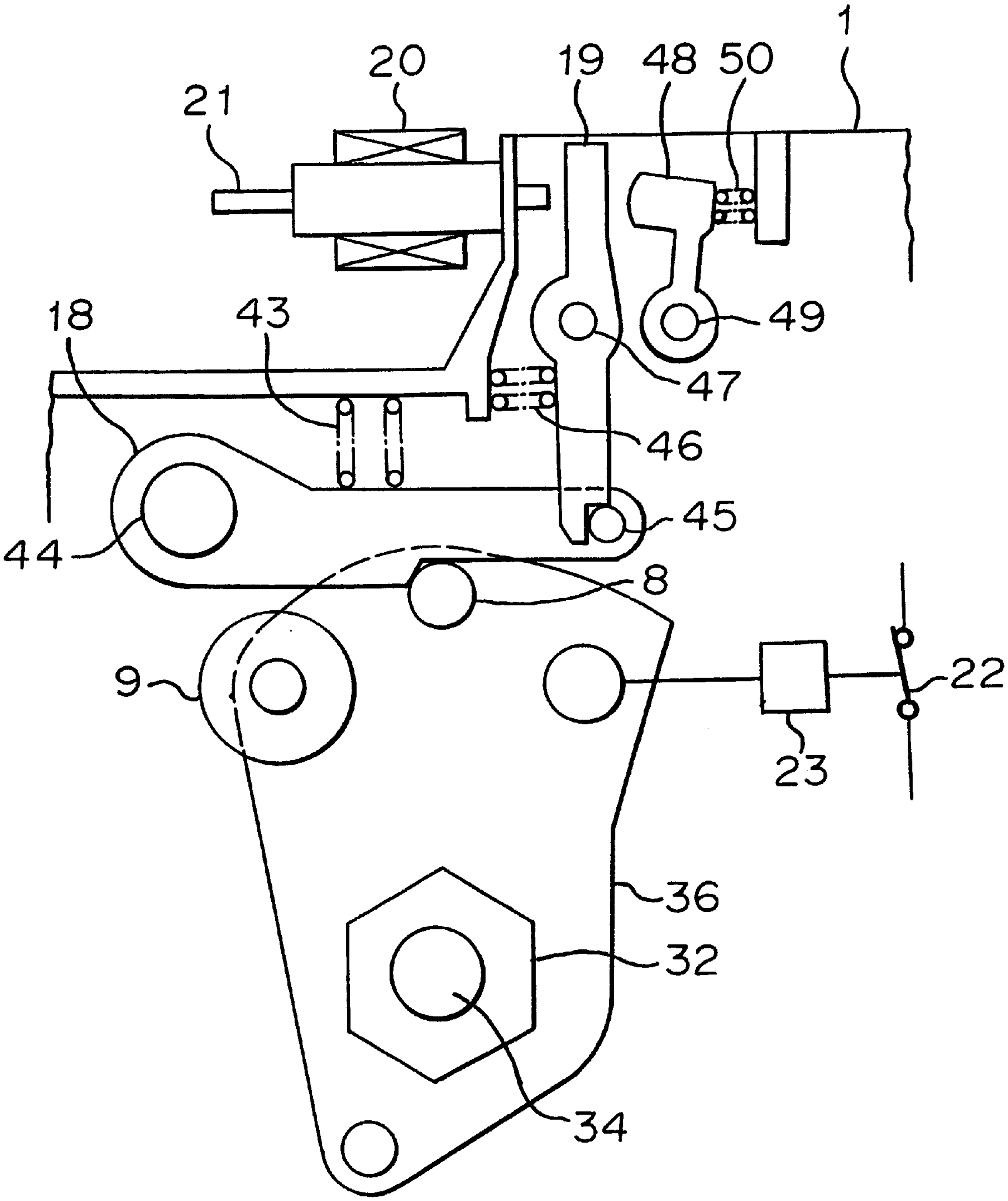
FIG. 3 is a plan view illustrating the important portion of the device for controlling the breaker under a state just before completing to close a circuit according to Embodiment 1 of the present invention.

FIGS. 1 through 3 are plan views illustrating an important portion of a device for controlling a breaker according to Embodiment 1 of the present invention, wherein states of an operation are sequentially illustrated. In FIGS. 1 through 3, numerical reference 34 designates a torsion bar fixed to a rotation shaft 32. In a similar manner to that in the conventional technique illustrated in FIGS. 10 through 13, torsion bars 28, 35, 29 are provided. Operation springs are constituted by the torsion bars 34, 28, 35, and 29.

Numerical reference 36 designates a breaking lever fixed to the rotation shaft 32 applied with counterclockwise turning force in FIG. 1 by the torsion bars 34, 28. Numerical reference 8 designates a pin A provided in the braking lever 36. Numerical reference 9 designates a rotator provided in the breaking lever 36. Numerical reference 22 designates a movable contact of the breaker, the movable contact is connected with the breaking lever 36 through a linkage mechanism 23.

Numerical reference 18 designates a releasing latch which engages the pin A 8 for retaining prestressing force of the torsion bars 34, 28. Numerical reference 44 designates a rotation shaft of the releasing latch 18. Numerical reference 43 designates a spring for applying clockwise turning force to the releasing latch 18. Numerical reference 45 designates a pin attached to the releasing latch 18. Numerical reference 19 designates a releasing trigger which engages the pin 45 of the releasing latch 18 for retaining a state of the releasing latch 18. Numerical reference 47 designates a rotation shaft of the releasing trigger 19. Numerical reference 46 designates a spring for applying counterclockwise turning force to the releasing trigger 19.

Numerical reference 48 designates a weight provided in the vicinity of the releasing trigger 19. Numerical reference 49 designates a rotation shaft of the weight 48. Numerical reference 50 designates an auxiliary spring for applying counterclockwise turning force to the weight 48 and urging the weight 48 to be in contact with a point p, being a contact point between the weight 48 and the releasing trigger 19. An equivalent mass obtained by dividing a moment of inertia around the rotation shaft 49 of the weight 48 by the square of the distance between the point p and the rotation shaft 49 is about one-third of an equivalent mass obtained by dividing a moment of inertia around the rotation shaft 47 of the releasing trigger 19 by the square of the distance between a point q and the rotation shaft 47. The point q is a contact point on the releasing trigger 19 opposite to the point p. Numerical reference 20 designates a releasing electromagnet having a plunger 21. Numerical reference 1 designates a casing for accommodating and attaching various portions of the device for controlling the breaker.

The other portions are similar to those described in the conventional technique illustrated in FIGS. 10 through 13. Although not illustrated in FIG. 1, a making latch 14, a making trigger lever 37, a gear 40, a pinion 39, a cam 3, and so on are further provided.

In the next, an operation of opening a circuit will be described.

Figure 10:
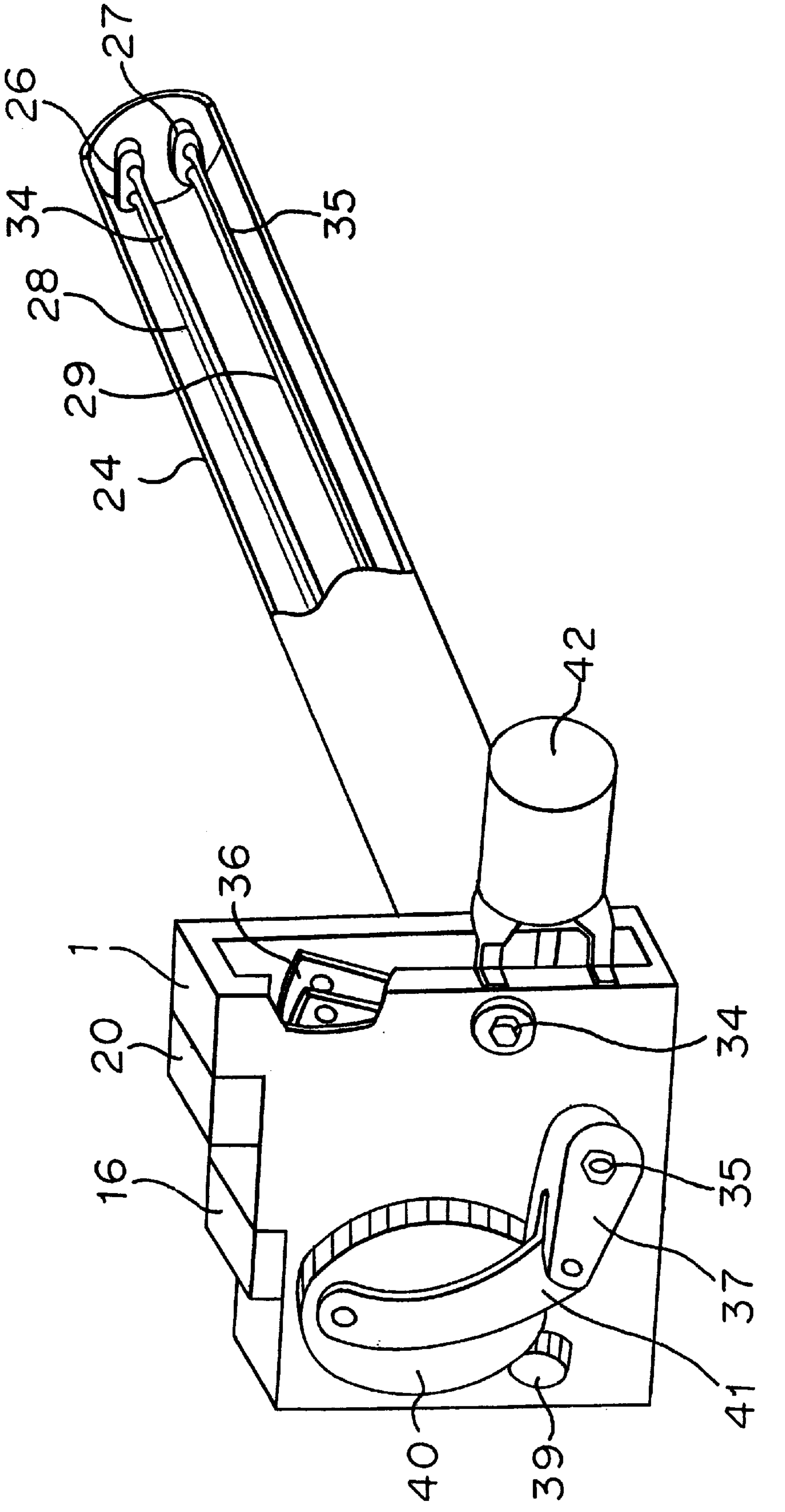
FIG. 10 PRIOR ART
FIG. 10 is a perspective view illustrating a conventional device for controlling a breaker.

In FIG. 1, the breaking lever 36 is constantly applied with counterclockwise turning force in FIG. 1 by the torsion bars 34, 28, wherein the torsion bar 28 is illustrated in FIG. 10. The turning force is retained by the releasing latch 18 and the releasing trigger 19. When the releasing electromagnet 20 is excited under this state, the plunger 21 rightward moves, and a releasing trigger 19 clockwise rotates, whereby an engagement between the releasing trigger 19 and the pin 45 of the releasing latch 18 is canceled. When the engagement between the releasing trigger 19 and the pin 45 is canceled, the releasing latch 18 is counterclockwise rotated by counter force from the pin A 8, whereby the releasing latch 18 is disengaged from the pin A 8. When the releasing latch 18 is disengaged from the pin A 8, the breaking lever 36 is counterclockwise rotated, and the movable contact 22 is driven in a direction of opening the circuit. While opening the circuit, the weight 48 is pushed by the releasing trigger 19 to thereby clockwise rotate against the auxiliary spring 50.

FIG. 2 illustrates a state that the operation of opening the circuit is completed.

An operation of closing the circuit will be described.

Figure 12:
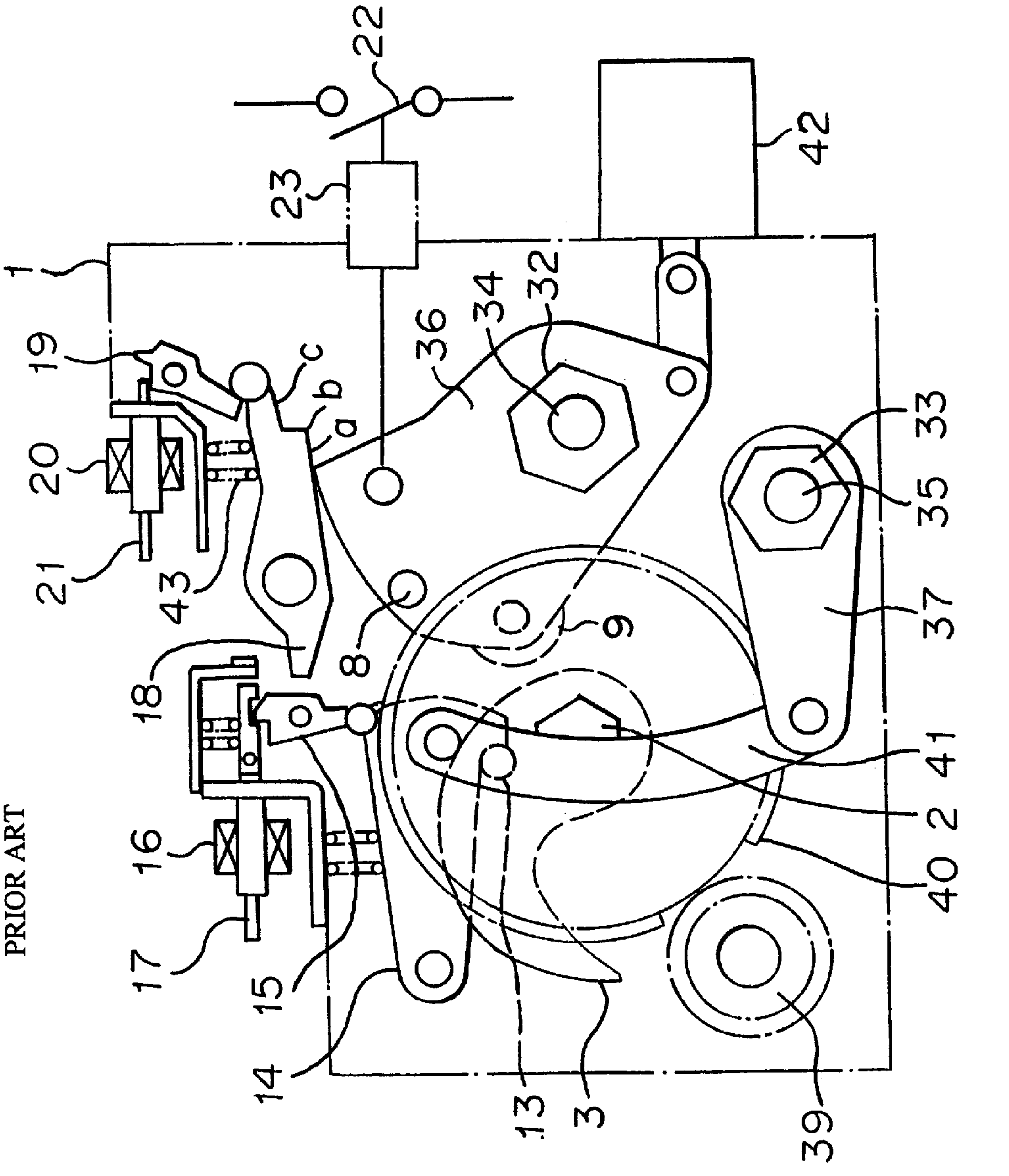
FIG. 12 PRIOR ART
FIG. 12 is a plan view illustrating the important portion of the conventional device for controlling the breaker under an opened circuit state.
Figure 13:
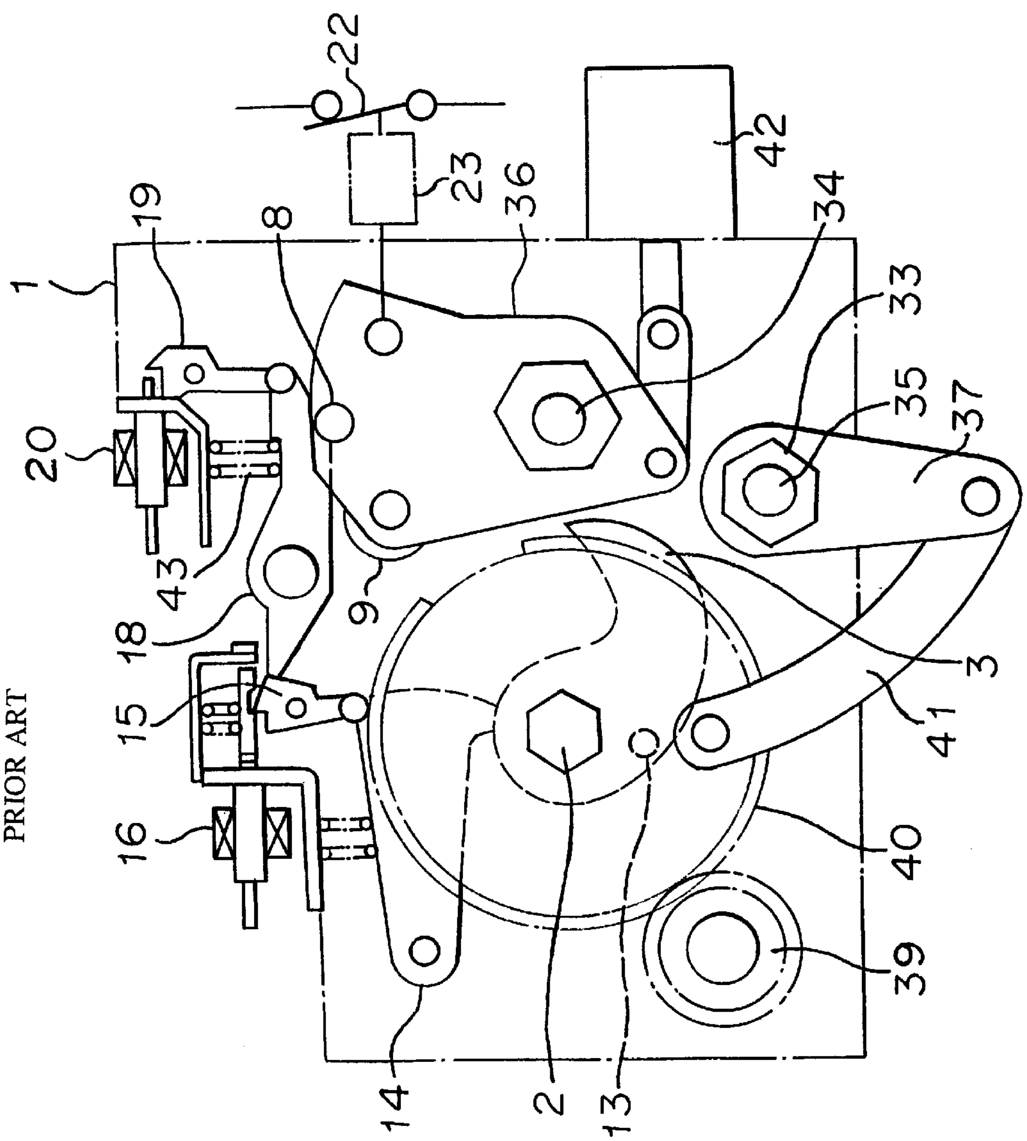
FIG. 13 PRIOR ART
FIG. 13 is a plan view illustrating the important portion of the conventional device for controlling the breaker under a state that a torsion bar for closing a circuit is released.

In a similar manner to that in the conventional device described in FIGS. 12 and 13, the cam 3 is rotated by the turning force of the torsion bars 29, 35 as illustrated in FIGS. 10 and 12. The roller 9 is pushed up by the cam 3, whereby the breaking lever 36 is clockwise rotated around the rotation shaft 32.

In FIG. 2, when the breaking lever 36 is rotated, the pin A 8 is in contact with a lower portion a of the releasing latch 18 to upward push up the releasing latch 18. Furthers when the breaking lever 36 is rotated, the pin A 8 exceeds an edge b of the releasing latch 18 and succeedingly is in contact with a step c of the releasing latch 18. Although there is probability that the releasing latch 18 rebounds by a collision between the step c and the pin A 8 to thereby counterclockwise rotate, the pin A 8 is settled by force of the spring 43 so as to be in contact with the step c of the releasing latch 18. Although the releasing trigger 19 keeps to be in contact with the pin 45 by force of the spring, when the pin 45 exceeds an edge d of the releasing trigger 19, the releasing trigger 19 is temporarily released from the pin 45. Thereafter, the releasing trigger 19 counterclockwise rotates until a step e of the releasing trigger 19 is in contact with the pin 45 by the force of the spring 46.

The weight 48 counterclockwise rotates while maintaining a contact with the releasing trigger 19 by force of an auxiliary spring 50 until the step e of the releasing trigger 19 is in contact with the pin 45. When the step e of the releasing trigger 19 is in contact with the pin 45, the releasing trigger 19 stops without rebounding. Simultaneously, the weight 48 clockwise rotates by removing from the releasing trigger 19 against the force of the auxiliary spring 50 in a process of damping of the weight by the auxiliary spring as illustrated in FIG. 3, wherein this operation will be described in detail in a latter part of this specification.

After starting to close the circuit until the releasing latch 18 and the releasing trigger 19 are settled at a predetermined engaged position, the breaking lever 36 is retained by the cam 3 against the turning force of the torsion bars 34, 28. Thereafter, the cam 3 is released from the retention, and the breaking lever 36 is retained by the releasing latch 18 and the releasing trigger 19. If the releasing trigger 19 does not stop and rebounds when the step e of the releasing trigger 19 is in contact with the pin 45, it is necessary to prolong a retention time of the breaking lever 36. Consequently, a completion of closing the circuit is delayed, and a succeeding operation of opening the circuit is also delayed.

The weight 48 finally stops in a state of being in contact with the releasing trigger 19 by the force of the auxiliary spring 50, as illustrated in FIG. 1.

Figure 11:
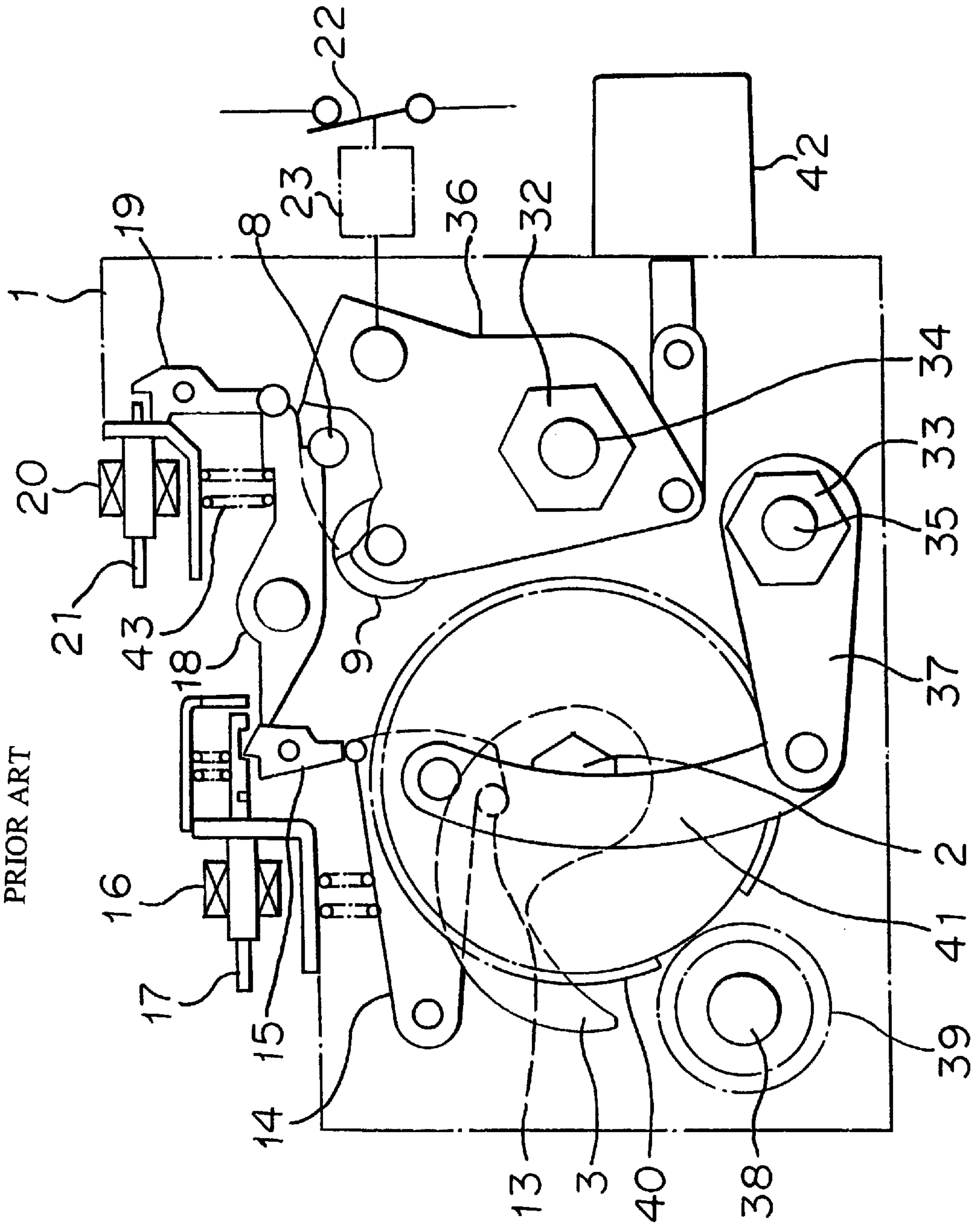
FIG. 11 PRIOR ART
FIG. 11 is a plan view illustrating an important portion of the conventional device for controlling the breaker under a closed circuit state.

A prestressing operation follows the same process as that from the released state of the torsion bars for closing the circuit illustrated in FIG. 13 to the prestressed state illustrated in FIG. 11, as in the conventional technique.

A principle that the releasing trigger 19 stops without rebounding at a time that the releasing trigger 19 and the pin 45 are engaged, and simultaneously the weight 48 clockwise rotates by being released from the releasing trigger 19 against the force of the auxiliary spring 50 will be described. Hereinbelow, an equivalent mass obtained by dividing a moment of inertia around the rotation shaft 49 of the weight 48 by the square of the distance between the point p and the rotation shaft 49 is expressed by m, and an equivalent value obtained by dividing a moment of inertia around the rotation shaft 47 of the releasing trigger 19 by the square of the distance between the point q and the rotation shaft 47 is expressed by M, where the equivalent mass means a mass equal to that applied to what to be in contact.

Further, a velocity of the point q of the releasing trigger 19 and a velocity of the point p of the weight 48 at a time just before the step e of the releasing trigger 19 is in contact with the pin 45 are expressed by v. The strength of the auxiliary spring 50 is selected so that the weight 48 can follow a movement of the releasing trigger 19. Although in the following calculation, it is assumed that a small gap exists between the releasing trigger 19 and the weight 48, a similar result is obtainable even though the releasing trigger 19 and the weight 48 are in contact.

Provided that the velocity of the point q of the releasing trigger 19 just after the step e of the releasing trigger 19 is in contact with the pin 45 is expressed by V, the following equation is established:

$$V=-e1\cdot v, \qquad \text{(Equation 1)}$$

where e1 represents a coefficient rebound between the step e of the releasing trigger 19 and the pin 45.

Succeedingly, when the releasing trigger 19 colloids with the weight 48, the following equation is established by a law of a conservation of momentum:

$$m\cdot v+M\cdot V=m\cdot v'+M\cdot V', \qquad \text{(Equation 2)}$$

where v' and V' respectively represent velocities of the releasing trigger 19 and the weight 48 just after the releasing trigger 19 collides with the weight 48.

Further, the following equation is established from a formula of rebound:

$$(v'-V')/(v-V)=-e2, \qquad \text{(Equation 3)}$$

where e2 is a coefficient of rebound between the releasing trigger 19 and the weight 48.

By combining Equations 1, 2, and 3, the following equation is established:

$$(m+M)\cdot V'=m\cdot v-M\cdot e1\cdot v+m\cdot e2\cdot(v+e1v) \qquad \text{(Equation 4)}$$

A condition that the releasing trigger 19 is stopped is as follows:

$$v'=0 \qquad \text{(Equation 5)}$$

By substituting Equation 5 into Equation 4, the following equation is established:

$$m=M\cdot e1/(1+e2+e1\cdot e2) \qquad \text{(Equation 6)}$$

Provided that the pin 45, the releasing trigger 19, the weight 48, and so on are made of a general structural material such as steel, because the coefficients of rebound e1 and e2 are 0.6 through 0.9 depending on a shape, a velocity, and so on. By substituting these values into Equation 6, a ratio between the equivalent mass m of the weight 48 and the equivalent mass M of the releasing trigger 19 is 1:2 through 1:4, wherein an effect of suppressing a rebound of the releasing trigger 19 by the weight 48 becomes large.

As described, in the present invention, the weight 48 is provided such that the weight 48 is urged by the auxiliary spring 50 so as to be movable along the operation of engaging with the releasing trigger 19 while maintaining the contact with the releasing trigger 19, and the weight 48 can escape in a direction adverse to the operation direction of the releasing trigger 19 at time of engaging against the force of the auxiliary spring 50, and the equivalent mass of the weight 48 is about one-third of the equivalent mass of the releasing trigger 19, the device for controlling the breaker, which completes to close the circuit within a short time by suppressing the rebound of the releasing trigger 19 at the time that the releasing latch 18 is in contact with the releasing trigger 19, is obtainable.

Embodiment 2

Figure 4:
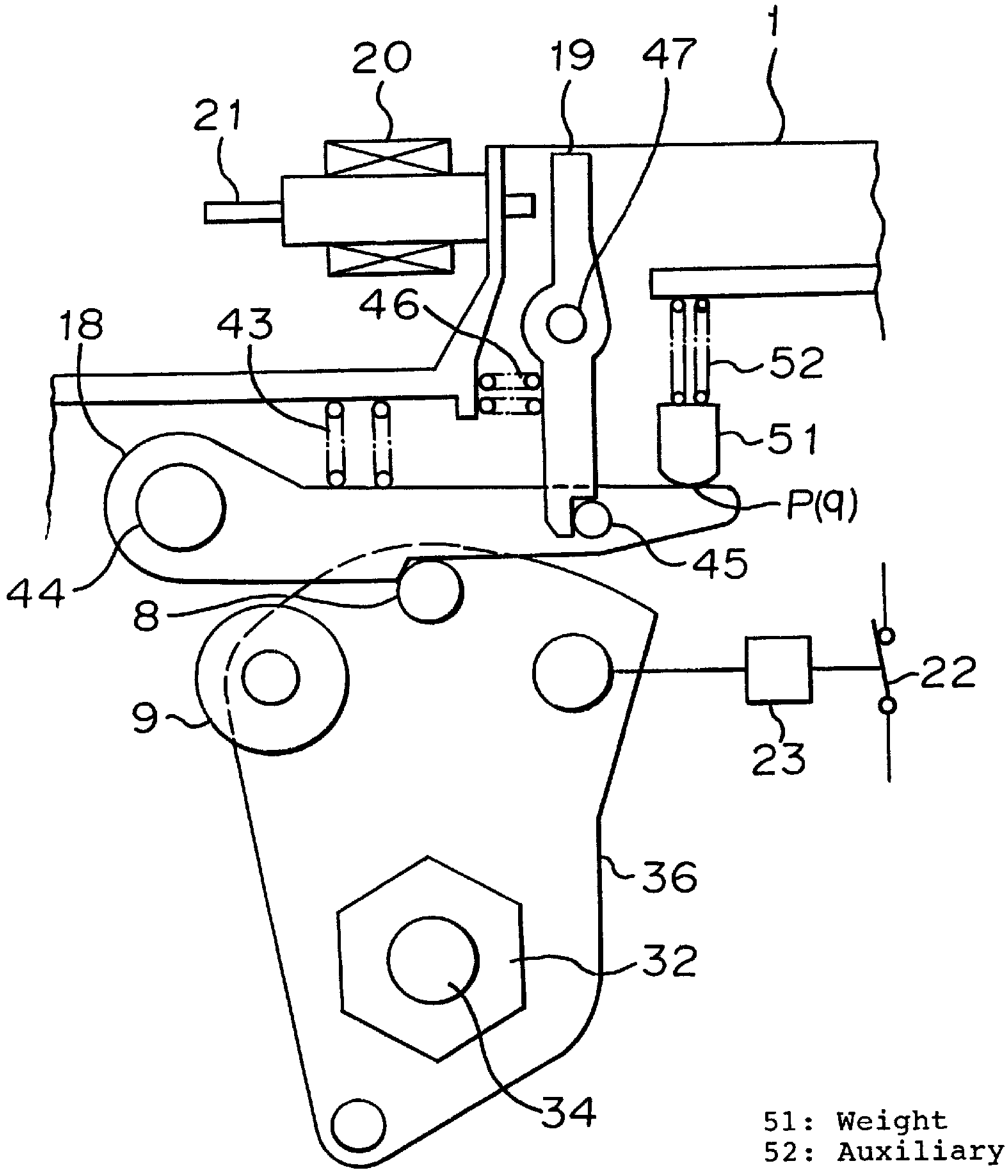
FIG. 4 is a plan view illustrating an important portion of a device for controlling a breaker under a closed circuit state according to Embodiment 2 of the present invention.
Figure 5:
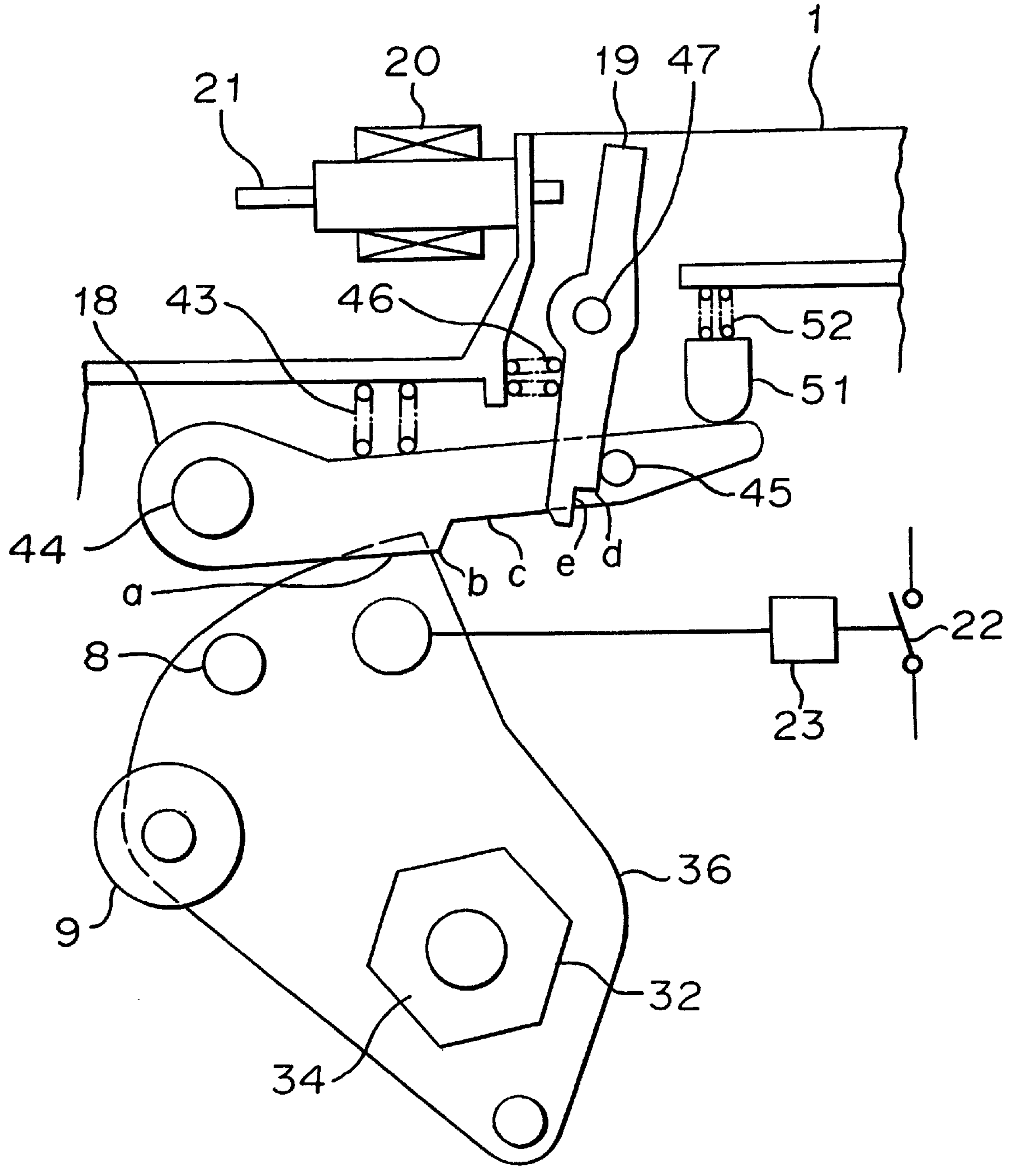
FIG. 5 is a plan view illustrating the important portion of the device for controlling the breaker under an opened circuit state according to Embodiment 2 of the present invention.
Figure 6:
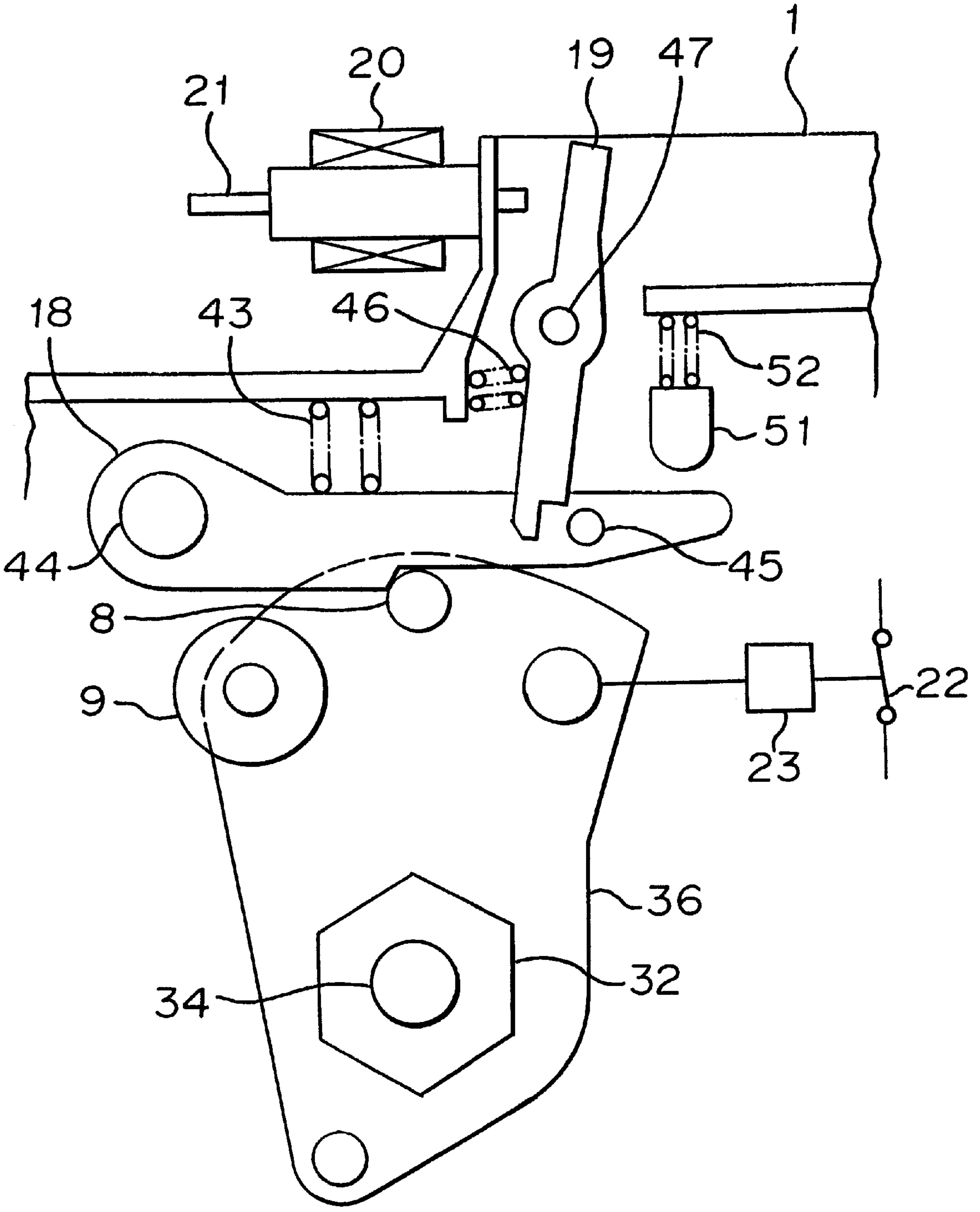
FIG. 6 is a plan view illustrating the important portion of the device for controlling the breaker under a state just before completing to close a circuit according to Embodiment 2 of the present invention.

FIGS. 4 through 6 are plan views illustrating an important portion of a device for controlling a breaker according to Embodiment 2 of the present invention, in which states of an operation are sequentially illustrated. In FIGS. 4 through 6, numerical reference 51 designates a weight provided in the vicinity of a releasing latch 18. Numerical reference 52 designates an auxiliary spring for applying downward force in FIGS. 4 through 6 so that the weight 51 is urged to be in contact with the drawing latch 18 at a point p. The mass of the weight 51 is about one-third of an equivalent mass obtained by a moment of inertia around a rotation shaft 44 of the releasing latch 18 by the square of a distance between a point q on the releasing latch 18 opposite to the point p and the rotation shaft 44. In Embodiment 2, the equivalent mass of the weight 51 is equal to the mass of the weight 51. The other portions of a structure is the same as those described in Embodiment 1 and description of these portions is omitted.

In the next, an operation of opening a circuit will be described. In FIG. 4, a breaking lever 36 is constantly applied with counterclockwise turning force by torsion bars 34, 28, which are illustrated in FIG. 10. The turning force is retained by the releasing latch 18 and a releasing trigger 19. When a releasing electromagnet 20 is excited in this state, a plunger 21 is rightward moved, the releasing trigger 19 is clockwise rotated, and an engagement between the releasing trigger 19 and a pin 45 is canceled, whereby the releasing latch 18 is counterclockwise rotated by counter force from a pin A 8. When the releasing latch 18 is disengaged from the pin A 8, the breaking lever 36 is counterclockwise rotated, and a movable contact 22 is driven to open the circuit. In the operation of opening the circuit, the weight 51 is pushed by the releasing latch 18 and upward moves against the auxiliary spring 52. FIG. 5 illustrates a state that the operation of opening the circuit is completed.

An operation of closing the circuit is similar to that described in Embodiment 1. When the circuit is closed, in reference of FIGS. 10 and 12, a cam 3 is rotated by turning force of torsion bars 29, 35, a roller 9 is pushed up by the cam 3, the breaking lever 36 is clockwise rotated around a rotation shaft 32. In FIG. 5, when the breaking lever 36 is rotated, the pin A 8 is in contact with a lower portion a of the releasing latch 18 to upward push up the releasing latch 18. When the breaking lever 36 is further rotated, the pin A 8 exceeds an edge b to thereby being in contact with a step c. At this time, the releasing latch 18 stops without rebounding, and the weight 51 is upward moved by escaping from the releasing latch 18 against force of the auxiliary spring 52 in a process of damping of the weight by the auxiliary spring as illustrated in FIG. 6. Succeedingly, the releasing trigger 19 is counterclockwise rotated by force of a spring 46, whereby a step e of the releasing trigger 19 is in contact with the pin 45. Thus, an engagement of the releasing trigger 19 is completed.

Because the breaking lever 36 is retained by the cam 3 against the turning force of the torsion bars 34, 28 after the operation of closing the circuit is started until the releasing latch 18 and the releasing trigger 19 are settled at predetermined engaged positions, if the releasing latch 18 rebounds without stopping at a time that the step of the releasing latch 18 is in contact with the pin A 8, it is necessary to prolong a retention time of the breaking lever as much. As a result, a completion of the operation of closing the circuit is delayed, and a succeeding operation of opening the circuit is also delayed.

The weight 51 is finally in contact with the releasing latch 18 by the auxiliary spring 52, whereby a state illustrated in FIG. 4 is regained.

A prestressing operation follows process similar to that described in Embodiment 1. The releasing latch 18 stops without rebounding at a time that the releasing latch 18 is engaged with the pin A 8, and simultaneously the weight 51 escapes from the releasing trigger 19 against the auxiliary spring 52 and upward moves. A principle of such a behavior of the weight 51 is similar to that in Embodiment 1 when the releasing latch 18 is substituted for the releasing trigger 19.

As described, since the weight 51 is urged by the auxiliary spring 52 so that the weight 51 moves while keeping the contact with the releasing latch 18 along the operation of engaging with the releasing latch 18 and escapes in a direction adverse to the direction of engaging with the releasing latch 18 against the force of the auxiliary spring 52, and the mass of the weight 51 is about one-third of an equivalent mass of the releasing latch 18, it is possible to obtain the device for controlling the breaker which closes the circuit within a short time by suppressing the rebound of the releasing latch when the releasing latch 18 is in contact with the pin A 8.

Embodiment 3

Figure 7:
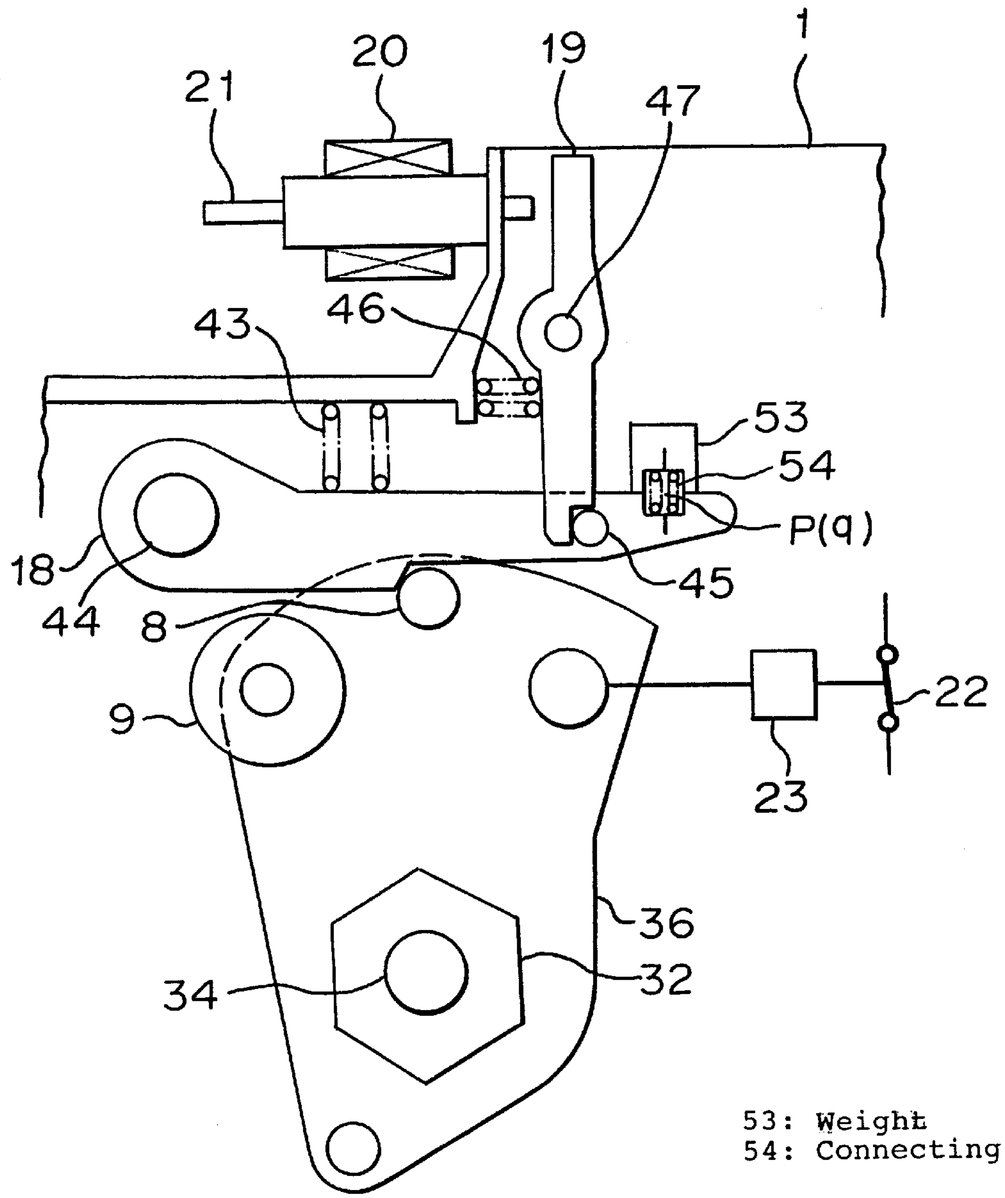
FIG. 7 is a plan view illustrating an important portion of a device for controlling a breaker under a closed circuit state according to Embodiment 3 of the present invention.
Figure 8:
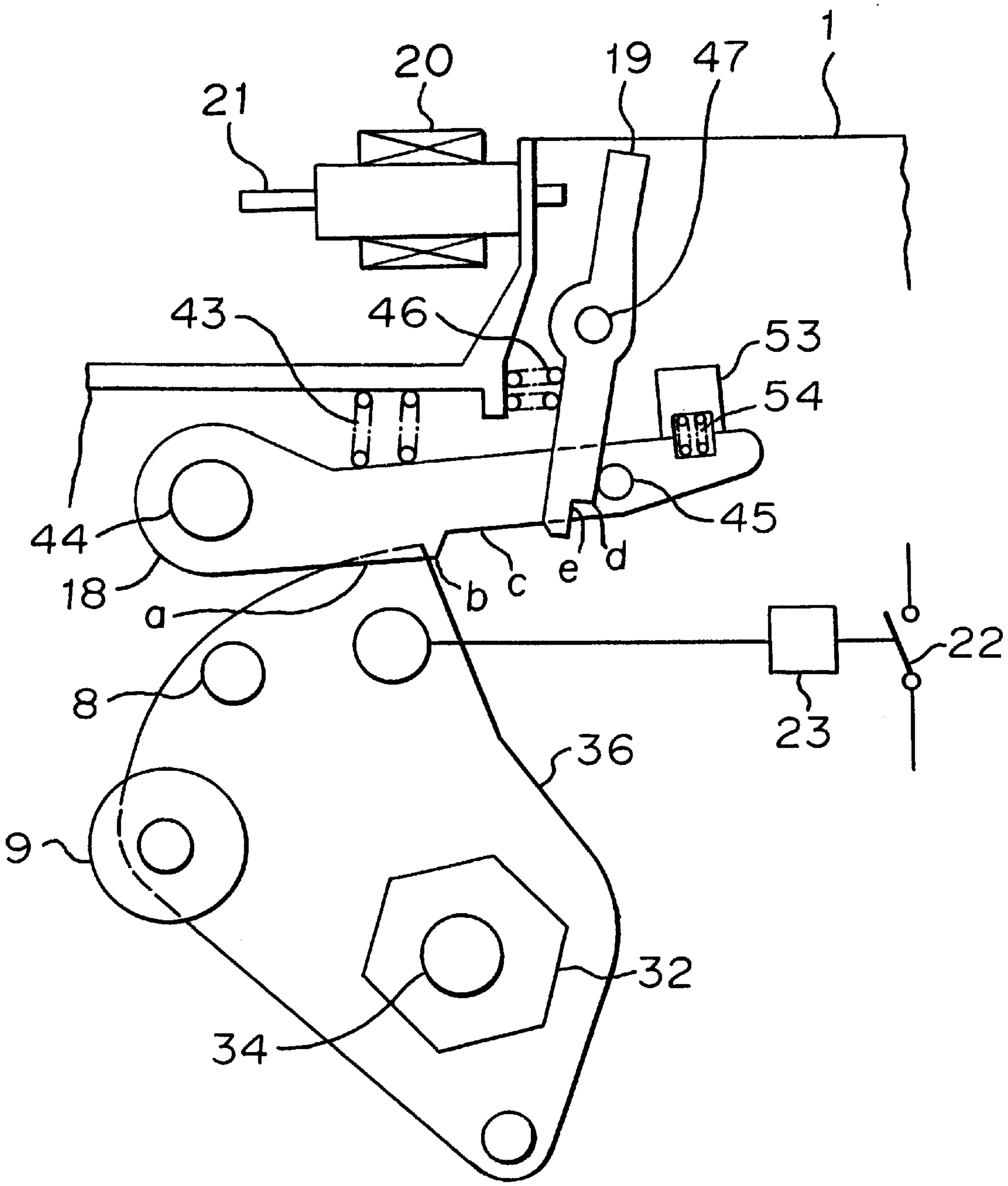
FIG. 8 is a plan view illustrating the important portion of the device for controlling the breaker under an opened circuit state according to Embodiment 3 of the present invention.
Figure 9:
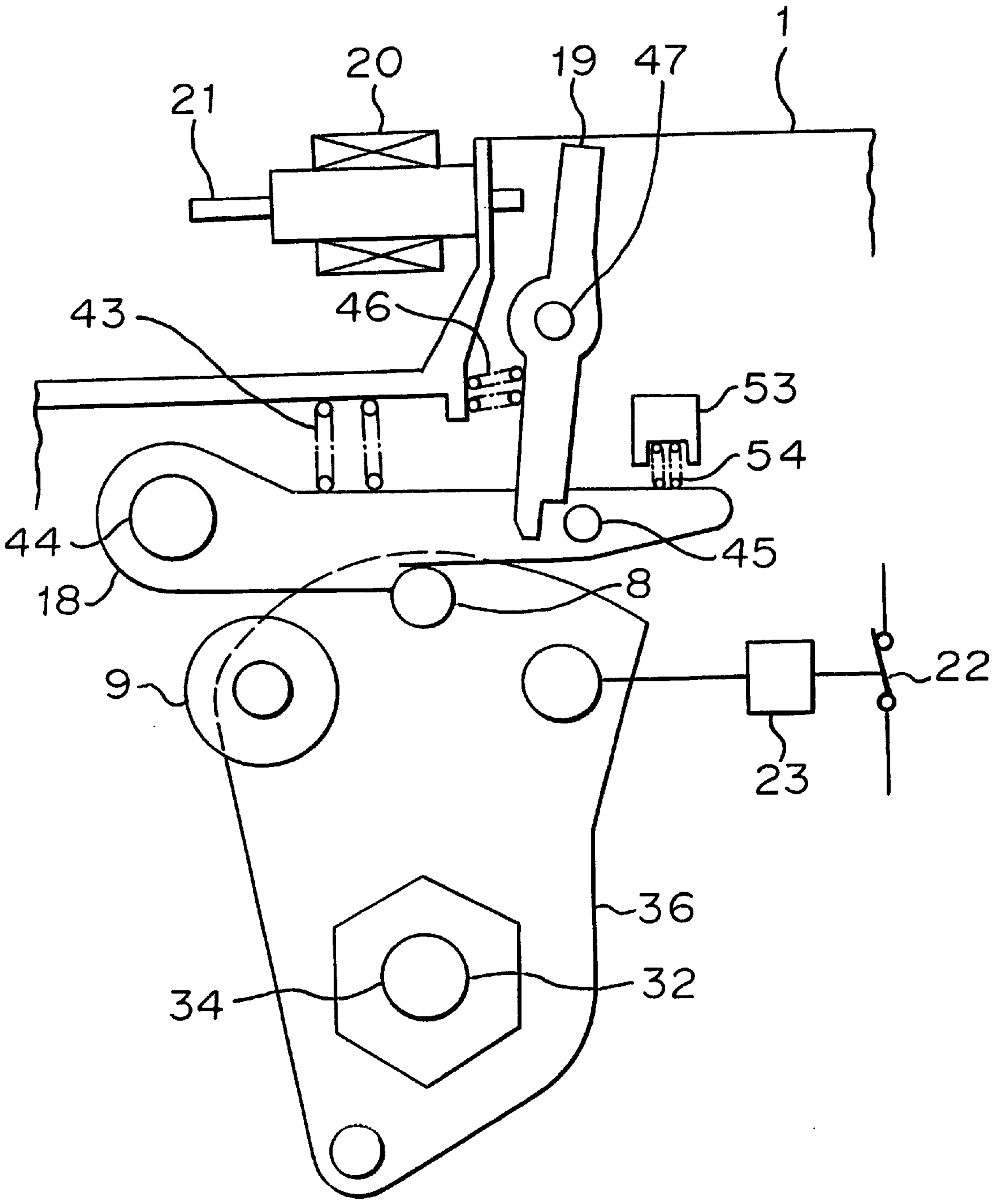
FIG. 9 is a plan view illustrating the important portion of the device for controlling the breaker under a state just before completing to close a circuit according to Embodiment 3 of the present invention.

FIGS. 7 through 9 illustrate plan views illustrating an important portion of a device for controlling a breaker according to Embodiment 3 of the present invention, in which states of an operation are sequentially illustrated. In FIGS. 7 through 9, numerical reference 53 designates a weight provided in the vicinity of a releasing latch 18, and numerical reference 54 designates a connecting spring as an auxiliary spring, which applies downward force to the weight 53 by connecting this with the releasing latch 18, whereby the weight 53 is urged to be in contact with the releasing latch 18.

In order to accommodate the connecting spring 54, a recess is formed in the weight 53 on a surface opposite to the releasing latch 18, and a recess is formed also in the releasing latch 18 on a surface opposite to the weight 53. Accordingly, a point p on a central axis of the weight 53 and a point q on a side of the releasing latch 18 opposite to the point p are equivalent contact points of the weight 53 and the releasing latch 18.

Further, the mass of the weight 53 is about one-third of an equivalent mass obtained by dividing a moment of inertia around a rotation shaft 44 of the releasing latch 18 by the square of a distance between the point q and the rotation shaft 44. In Embodiment 3, the equivalent mass of the weight 53 is equal to the mass of the weight 53. The other portions of a structure of Embodiment 3 is similar to those described in Embodiment 2 and description of these portions is omitted.

In the next, an operation of opening a circuit will be described. In FIG. 7, when a releasing electromagnet 20 is excited, a plunger 21 is rightward moved, a releasing trigger 19 is clockwise rotated, and an engagement between the releasing trigger 19 and a pin 45 is canceled, whereby the releasing latch 18 is counterclockwise rotated by counter force from a pin A 8. When the releasing latch 18 is disengaged from the pin A 8, a breaking lever 36 is counterclockwise rotated, and a movable contact 22 is driven in a direction of opening the circuit. While opening the circuit, the weight 53 is in contact with the releasing latch 18 by tensile force of the connection spring 54. FIG. 8 illustrates a state that the operation of opening the circuit is completed.

The operation of closing the circuit will be described in reference of FIGS. 10 and 12 in a similar manner to that in Embodiment 2. At a time of closing the circuit, the cam 3 is rotated by turning force of torsion bars 29, 35, a roller 9 is pushed up by the cam 3, and the breaking lever 36 is clockwise rotated around a rotation shaft 32. In FIG. 8, when the breaking lever 36 is rotated, the pin A 8 is in contact with a lower portion a of the releasing latch 18, exceeds an edge b, and is in contact with a step c. At this time, the releasing latch 18 stops without rebounding, and the weight 53 upward moves by escaping from the releasing latch 18 against force of the connection spring 54, as illustrated in FIG. 9. Succeedingly, an engagement between the releasing trigger 19 and the pin 45 is completed. Until the releasing latch 18 and the releasing trigger 19 are settled at predetermined engaged positions, the breaking lever 36 is retained by the cam 3. Therefore, if the step c of the releasing latch 18 rebounds without stopping when the step c is in contact with the pin A 8, a retention time of the breaking lever 36 should be prolonged as much. As a result, a completion of closing the circuit and a succeeding operation of opening the circuit are delayed.

The weight 53 is finally in contact with the releasing latch 18 by the force of the connection spring 54 as illustrated in FIG. 7.

A prestressing operation follows a process similar to that described in Embodiment 2. A principle that the releasing latch 18 stops without rebounding when the releasing latch 18 is in contact with the pin A 8 and the weight 53 escapes from the releasing trigger 19 against the force of the connection spring 54 is similar to that described in Embodiment 2.

As described, since the weight 53 is connected with the releasing latch 18 by the connection spring 54 so that it can move along the engagement of the releasing latch while maintaining a contact with the releasing latch 18 and escapes in a direction opposite to a direction that the releasing latch 18 is engaged against force of the connection spring 54, and the mass of the weight 53 is about one-third of the equivalent mass of the releasing latch 18, it is possible to obtain the device for controlling the breaker, which can close the circuit within a short time by suppressing the rebound of the releasing latch 18 when the releasing latch 18 is in contact with the pin A 8.

Although, in Embodiment 1, the weight 48 is rotated around the rotation shaft 49, it is possible to adopt a structure that the mass of the weight as the equivalent mass effects on the releasing trigger 19 in a similar manner to that in Embodiment 2 and to use an auxiliary spring as a connection spring for connecting the weight with the releasing trigger.

Although, in Embodiments 2 and 3, a structure that the mass of the weight 51 or 53 effects the releasing latch as the equivalent mass, it is possible to use a value obtained by dividing a moment of inertia around the rotation shaft provided in the weight as in Embodiment 1 by the square of a distance between the contact point and the rotation shaft as the equivalent mass.

The first advantage of the device for controlling the breaker according to the present invention is that the repulsion is suppressed when the releasing trigger is engaged, and therefore a time necessary for completing to close the circuit is shortened.

The second advantage of the device for controlling the breaker according to the present invention is that the structure is simplified by using the connection spring as the auxiliary spring for connecting the weight with the releasing trigger.

The third advantage of the device for controlling the breaker according to the present invention is that a function of suppressing the repulsion of the releasing trigger is enhanced.

The fourth advantage of the device for controlling the breaker according to the present invention is that the repulsion of the releasing latch is suppressed when the releasing latch is engaged, and therefore, a time necessary for closing the circuit is shortened.

The fifth advantage of the device for controlling the breaker according to the present invention is that the structure is simplified because the connection spring is used for connecting the weight with the releasing latch as the auxiliary spring.

The sixth advantage of the device for controlling the breaker according to the present invention is that a function of suppressing the rebound of the releasing latch is enhanced.

Obviously, numerous modifications and variations of the present invention are possible in right of the above teachings. It is therefore to be understood that within the scope of the appended claims, the invention may be practiced otherwise than as specifically described herein.

What is claimed is:

1. A device for controlling a breaker comprising:

a breaking lever for opening and closing a circuit along with prestressing force and releasing force of an operation spring, a releasing latch for retaining the prestressing force of said operation spring, the releasing latch is engaged with the breaking lever, and a releasing trigger for retaining a state of said releasing latch by being engaged with said releasing latch, further comprising:

a weight provided in the vicinity of said releasing trigger, and an auxiliary spring for urging said weight so that said weight is in contact with said releasing trigger.

2. The device for controlling the breaker according to claim 1, wherein said auxiliary spring is a connection spring for connecting said weight with said releasing trigger.

3. The device for controlling the breaker according to claim 1, wherein a ratio between an equivalent mass of said weight and an equivalent mass of said releasing trigger is 1:2 through 1:4 at a contact point between said weight and said releasing trigger.

4. The device for controlling the breaker according to claim 1, wherein a ratio between an equivalent mass of said weight and an equivalent mass of said releasing trigger is 1:2 through 1:4 at a contact point between said weight and said releasing trigger.

5. The device for controlling a breaker comprising:

a breaking lever for opening and closing a circuit along with prestressing force and releasing force of an operation spring, a releasing latch for retaining the prestressing force of said operation spring, the releasing latch is engaged with said breaking lever, and a releasing trigger for retaining a state of said releasing latch by being engaged with said releasing latch, further comprising:

a weight provided in the vicinity of said releasing latch, and an auxiliary spring for urging said weight so that said weight is in contact with said releasing latch.

6. The device for controlling the breaker according to claim 5;

wherein said auxiliary spring is a connection spring for connecting said weight with said releasing latch.

7. The device for controlling the breaker according to claim 6, wherein a ratio between an equivalent mass of said weight and an equivalent mass of said releasing latch is 1:2 through 1:4 at a contact point between said weight and said releasing latch.

8. The device for controlling the breaker according to claim 5, wherein a ratio between an equivalent mass of said weight and an equivalent mass of said releasing latch is 1:2 through 1:4 at a contact point between said weight and said releasing latch.

* * * * *